(12) United States Patent
Schonstein et al.

(10) Patent No.: US 10,337,904 B2
(45) Date of Patent: Jul. 2, 2019

(54) APPARATUS AND METHOD FOR DETERMINING FLOW OF A MEDIUM

(71) Applicant: Innovative Sensor Technology IST AG, Wattwil (CH)

(72) Inventors: Thomas Schonstein, Bilten (CH); Roger Schell, Nesslau (CH); Christoph Hepp, Wil (CH)

(73) Assignee: INNOVATIVE SENSOR TECHNOLOGY IST IG, Ebnat-Kappel (CH)

( * ) Notice: Subject to any disclaimer, the term of this patent is extended or adjusted under 35 U.S.C. 154(b) by 194 days.

(21) Appl. No.: 15/105,065

(22) PCT Filed: Dec. 10, 2014

(86) PCT No.: PCT/EP2014/077203
§ 371 (c)(1),
(2) Date: Jun. 16, 2016

(87) PCT Pub. No.: WO2015/091149
PCT Pub. Date: Jun. 25, 2015

(65) Prior Publication Data
US 2016/0327421 A1    Nov. 10, 2016

(30) Foreign Application Priority Data

Dec. 19, 2013   (DE) .................. 10 2013 114 486

(51) Int. Cl.
*G01F 1/696*    (2006.01)
*G01F 25/00*    (2006.01)
(Continued)

(52) U.S. Cl.
CPC .......... *G01F 25/0007* (2013.01); *G01F 1/696* (2013.01); *G01F 1/699* (2013.01); *G01F 1/6986* (2013.01); *G01F 1/6845* (2013.01)

(58) Field of Classification Search
CPC .......... G01F 1/696; G01F 1/698; G01F 1/699; G01F 25/0007
See application file for complete search history.

(56) References Cited

U.S. PATENT DOCUMENTS 5,892,150 A    4/1999   ISono
6,230,560 B1   5/2001   Suzuki
(Continued)

FOREIGN PATENT DOCUMENTS

DE    4208135 A1    9/1993
DE    19800628 A1   7/1998
(Continued)

OTHER PUBLICATIONS

English Translation of the International Preliminary Report on Patentability, WIPO, Geneva, CH, dated Apr. 7, 2015.

*Primary Examiner* — Justin N Olamit
(74) *Attorney, Agent, or Firm* — Bacon & Thomas, PLLC

(57) ABSTRACT

A thermal flow sensor for determining flow of a medium, comprising: a substrate; first and second temperature sensors arranged on the substrate, wherein the first and second temperature sensors are embodied as heatable temperature sensors or as a first non-heatable temperature sensor, which is associated with a first heating element, and as a second non-heatable temperature sensor, which is associated with a second heating element; a power supply unit, which by means of a first signal supplies the first heatable temperature sensor or the first heating element with a first heating power determined earlier during an adjustment operation and by means of a second signal supplies the second heatable temperature sensor or the second heating element with a second heating power determined earlier in the adjustment operation; and an evaluation unit, which in a measurement operation for determining flow of the medium ascertains a temperature difference between the first temperature sensor
(Continued)

and the second temperature sensor and based on the temperature difference determines a measured value, which represents the flow of the medium.

12 Claims, 1 Drawing Sheet

(51) Int. Cl.
*G01F 1/699* (2006.01)
*G01F 1/698* (2006.01)
G01F 1/684 (2006.01)

(56) References Cited

U.S. PATENT DOCUMENTS

| | | | |
|---|---|---|---|
| 6,370,950 B1* | 4/2002 | Lammerink | G01F 1/699 73/204.15 |
| 6,871,536 B2* | 3/2005 | Ariyoshi | G01F 1/6986 73/204.26 |
| 6,988,400 B2 | 1/2006 | Lotters | |
| 7,797,997 B2* | 9/2010 | Wu | G01F 1/6845 73/204.26 |
| 2003/0041664 A1 | 3/2003 | Ariyoshi | |
| 2009/0049907 A1 | 2/2009 | Wu | |
| 2016/0327421 A1 | 11/2016 | Schonstein | |

FOREIGN PATENT DOCUMENTS

| | | |
|---|---|---|
| DE | 10202210 A1 | 8/2003 |
| DE | 102005057687 A1 | 6/2007 |
| DE | 102005057689 A1 | 6/2007 |
| DE | 102013114486 A1 | 6/2015 |
| EP | 1477779 A1 | 11/2004 |

* cited by examiner

APPARATUS AND METHOD FOR DETERMINING FLOW OF A MEDIUM

TECHNICAL FIELD

The invention relates to a thermal flow sensor as well as to a method for determining flow of a medium.

BACKGROUND DISCUSSION

For determining flow characteristics, especially the flow, of a medium, respectively a fluid, thermal measuring devices are known, which make use of the fact that a (flowing) medium transports heat. The flow sensors have, in such case, a classic construction composed of at least one heating element and at least one temperature sensor, in order to determine the flow of the medium.

Known from the state of the art are so called anemometers, in the case of which the heating power is controlled in such a manner that a predetermined temperature is established on the at least one temperature sensor due to the heat transport of the medium. Based on the supplied, controlled, heating power, the flow of the medium can be determined.

Known, furthermore, from the state of the art are so called calorimetric flow sensors, which ascertain the flow of the medium by means of two temperature sensors and a heating element lying between the two temperature sensors. In such case, the medium is heated at the heating element and the temperature difference between the two temperature sensors determined, in order so to obtain the flow of the medium. In the case of this method, the heating power supplied to the heating element is not controlled. The present invention relates to such calorimetric flow sensors.

Due to layout- and manufacturing tolerances, as well as inhomogeneities in substrate and layer structure, temperature sensors formed on a substrate are not one hundred percent thermally and/or electrically stable. Such is necessary for an exact zero point. These deviations of the zero point, thus the zero point offset, can rise to one hundred percent of the actual measured value. Especially, in the case of microfluidic applications, which have a very small measuring range of 1 ml/min and less, a more exact and temperature stable zero point is of great importance, since this is permitted to deviate by only fractions of the measuring range.

For adjusting this zero point correspondingly, essentially two adjustment methods are known from the state of the art. In the case of the first adjustment method, the resistance bridge, which typically serves for evaluation of the temperature sensors, is adjusted by means of laser trimming of the temperature sensors. Disadvantageous in such case is that the laser trimming cannot be applied to all substrates, respectively to all layers, of the flow sensor. The second method is an electronic adjustment wherein an offset correction is performed in the signal path of the sensor electronics, such that in the case of a flow of zero the measurement signal is likewise essentially zero. Disadvantageous in this method is that a desired temperature stability, respectively temperature independence, of the zero point is only conditionally achieved.

SUMMARY OF THE INVENTION

An object of the invention is to optimize the adjustment of the zero point of a flow sensor.

The object is achieved by a thermal flow sensor and by a method for determining flow of a medium.

As regards the flow sensor, the object is achieved by a thermal flow sensor for determining flow of a medium, wherein the flow sensor comprises:
a substrate;
first and second temperature sensors arranged on the substrate, wherein the first and second temperature sensors are embodied as heatable temperature sensors or as a first non-heatable temperature sensor, which is associated with a first heating element, and as a second non-heatable temperature sensor, which is associated with a second heating element,
a power supply unit, which by means of a first signal supplies the first heatable temperature sensor or the first heating element with a first heating power determined earlier during an adjustment operation and by means of a second signal supplies the second heatable temperature sensor or the second heating element with a second heating power determined earlier in the adjustment operation;
an evaluation unit, which in a measurement operation for determining flow of the medium ascertains a temperature difference between the first temperature sensor and the second temperature sensor and based on the temperature difference determines a measured value, which represents the flow of the medium.

Via the first heating power supplied to the first heating element and the second heating power supplied to the second heating element, i.e. powers which were determined earlier in the adjustment operation, the zero point of the flow sensor can essentially be shifted, respectively adjusted, to zero.

For this, according to the invention, two adjoining or even partially overlapping heating elements are differently strongly heated, so that the temperature profile over the sensor structure can be shifted downstream or upstream, in order correspondingly to adapt the zero point.

Thus, a direct physical adjustment is enabled, which thermally balances the heating elements and, thus, the zero point at a flow of zero is, in fact, adjusted to zero. In contrast to the above described electronic calibration method, in the case of which an offset correction occurs in the signal path of the sensor electronics, this direct physical adjustment assures an excellent temperature stability, respectively temperature independence, of the zero point.

Furthermore, the direct physical adjustment assures a very high precision of at least 10 ppm of the measuring range and the adjustment range can lie between about 10%-1000% of the measuring range. Such performance cannot be achieved with the adjustment methods known from the state of the art, such as, for example, laser trimming.

The terminology, thermal flow sensor, is meant herein to include the thermal flow sensors known from the state of the art as well as also thermal conductivity sensors.

An advantageous embodiment provides that the first and second heatable temperature sensors or the first and second heating elements are embodied on the substrate in such a manner that they adjoin one another or at least partially overlap. By arranging the two heatable temperature sensors or the two heating elements such that they overlap, thus are interlocked, or at least partially contact, the resolution of the offset compensation can be increased.

Another advantageous embodiment provides that the heatable temperature sensors are composed of a temperature dependent resistance material and the evaluation unit ascertains the temperature difference based on a temperature coefficient of the temperature dependent resistance material.

An alternative embodiment provides that the first and second heating elements are composed of an essentially temperature independent and/or temperature dependent resistance material and the evaluation unit ascertains the temperature difference between the first and second temperature sensors. Especially, this embodiment provides that the two heating elements are, in each case, composed of an essentially temperature independent resistance material or, in each case, a temperature dependent resistance material. Other options include an embodiment, in the case of which one of the two heating elements is composed of a temperature independent resistance material and the other heating element of a temperature dependent resistance material.

Another advantageous embodiment provides that the power supply unit individually activates the first and second heatable temperature sensors or the first and second heating elements, in each case, such that the heating powers supplied to the respective temperature sensors, respectively the respective heating elements, are individually adjustable.

Another advantageous embodiment provides that the first and second signals are continuous signals or discrete signals or a mixture of continuous and discrete signals.

Another advantageous embodiment provides that the power supply unit during measurement operation provides the first heating power and the second heating power independently of the temperature difference. In other words, the first and the second heating power, after they have been once ascertained, are supplied to the first and second heatable temperature sensors, respectively the first and second heating elements in a constant manner, i.e. there is no controlling of the heating powers as a function of the temperature difference.

Another advantageous embodiment provides that the first and second signals are pulse width modulated signals and the power supply unit sets the first heating power and the second heating power via the on off ratios of the pulse width modulated signals.

Another advantageous embodiment provides that the first and second temperature sensors are embodied as thermocouples, resistance temperature sensors, NTC resistances, radiation sensors or semiconductor elements. The terminology, resistance temperature sensors, refers to various metallic sensors suitable for ascertaining temperature, thus, for example, Pt resistance sensors and Ni resistance sensors.

As regards the method, the object is achieved by a method for determining flow of a medium with a flow sensor as above described, wherein the method includes steps as follows:
adjusting the flow sensor, wherein for the adjusting the flow sensor is placed in an adjustment operation, in which the flow of the medium is brought to, respectively held at, essentially zero, in order to ascertain the first heating power to be supplied to the first heatable temperature sensor or to the first heating element and the second heating power to be supplied to the second heatable temperature sensor or to the second heating element, wherein the first and second heating powers are ascertained in such a manner that in the case of supplying the first heatable temperature sensor or the first heating element with the first heating power and in the case of supplying the second heatable temperature sensor or the second heating element with the second heating power the measurement signal of the flow sensor is essentially zero;
measuring the flow of the flowing medium, wherein for measuring the flow the flow sensor is placed in a measurement operation and in the measurement operation the first heatable temperature sensor or the first heating element is supplied with the first heating power ascertained in the adjustment operation and the second heatable temperature sensor or the second heating element is supplied with the second heating power ascertained in the adjustment operation, so that a temperature difference is ascertainable between the first temperature sensor and the second temperature sensor and based on the temperature difference the flow of the medium is determined.

An advantageous form of embodiment of the method provides that continuous signals or discrete signals or a mixture of continuous and discrete signals are used as first and second signals for supplying the first and second heating powers.

Another advantageous form of embodiment of the method provides that pulse width modulated signals are used as first and second signals.

BRIEF DESCRIPTION OF THE DRAWINGS

The invention will now be explained in greater detail based on the appended drawing, the figures of which show as follows.

DETAILED DISCUSSION IN CONJUNCTION WITH THE DRAWINGS

Figure 1:
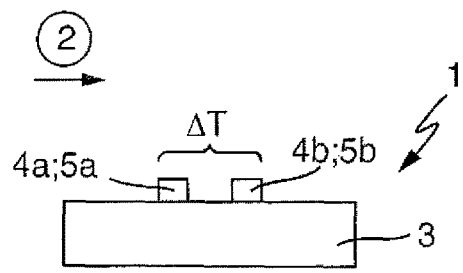
FIG. 1 is a schematic representation of a first embodiment of the sensor of the invention.

FIG. 1 shows, by way of example, a schematic representation of a first embodiment of the sensor of the invention. The sensor is, in such case, built on a substrate 3, for example, a polymer substrate. Placed on the substrate 3 are at least two heatable temperature sensors 5a and 5b. In this embodiment, the heatable temperature sensors 5a and 5b serve both as heating elements and also as "actual" temperature sensors 4a and 4b. The two heatable temperature sensors 5a and 5b are operated by means of a first signal 9a and a second signal 9b, respectively supplied with heating power needed for heating the medium 2. For this, the first heatable temperature sensor 5a is fed the first signal 9a and the second heatable temperature sensor 5b the second signal 9b. The temperature sensors 4 are typically applied on the substrate by means of thin layer methods. The heatable temperature sensors 5a and 5b are in the case of the first form of embodiment made of a material having a temperature dependent resistance, for example, platinum or nickel. Due to the temperature dependent resistance, a temperature coefficient specific for the temperature sensor can be determined. Based on this specific temperature coefficient, thus, an evaluation unit can determine the temperature of the first and second temperature sensors and, thus, the temperature difference. Typically, this determination is performed by calculation. Thus, in the case of the first embodiment, the two temperature sensors 4 serve, on the one hand, as heating elements and, on the other hand, also simultaneously as "actual" temperature sensors.

Figure 2:
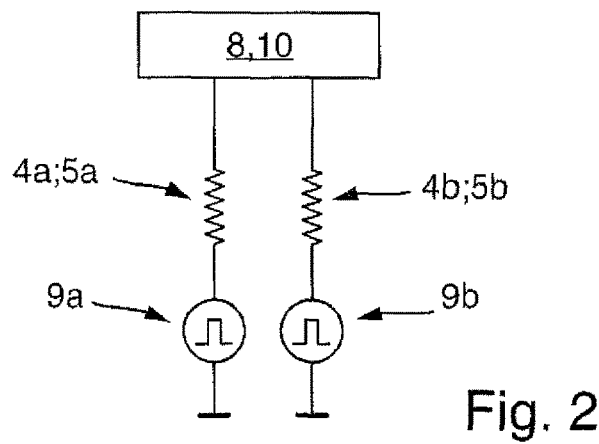
FIG. 2 is a block diagram of a first embodiment of the sensor.

FIG. 2 shows a schematic block diagram for the first embodiment of the sensor 1. In such case, the first and second heatable temperature sensors are supplied with pulse width modulated signals that serve as first signal 9a and second signal 9b. Serving for the supply is the power supply unit 8 and for evaluation of the temperature difference ΔT an evaluation unit 10. The evaluation unit 10 ascertains as a function of two signals 9a, 9b and the known temperature coefficient of the resistance material the temperature difference ΔT. Based on this ascertained temperature difference ΔT, then a measured value representing the flow of the medium 2 can be determined. Both the power supply unit 8 as well as also the evaluating unit 10 can, in given cases, be implemented by a single microprocessor, which fulfills the two functions (supply and evaluation).

Figure 3:
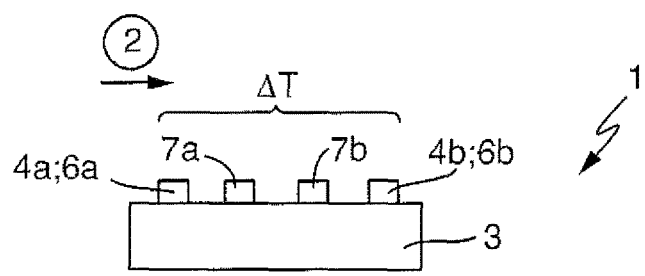
FIG. 3 is a schematic representation of a second embodiment of the sensor of the invention.

FIG. 3 shows, by way of example, a schematic representation of a second embodiment of the sensor 1 of the invention. In the case of this embodiment, two non-heatable temperature sensors 6a, 6b and two additional heating elements 7a and 7b are provided.

The temperature sensors 6a and 6b are, for example, temperature sensitive resistance structures or even thermopiles. The two temperature sensors 6a and 6b are so arranged on the substrate 3 that one temperature sensor 6b is located upstream and the other temperature sensor 6a downstream. In this way, besides flow velocity, also flow direction can be detected. Typically, such temperature sensors 6 are evaluated by means of a resistance bridge, in order to obtain the temperature difference ΔT between the two temperature sensors 6. Via the adjustment procedure the first and second heating powers are so selected that the first and second heating elements 7a and 7b are differently heated, so that the temperature dependent resistance of the two temperature sensors is essentially equal in the case of no flow. In other words, an adjusting of the zero point of the flow sensor is performed, so that the zero point in the case of a flow of zero is likewise zero and a measured value of essentially zero results.

Figure 4:
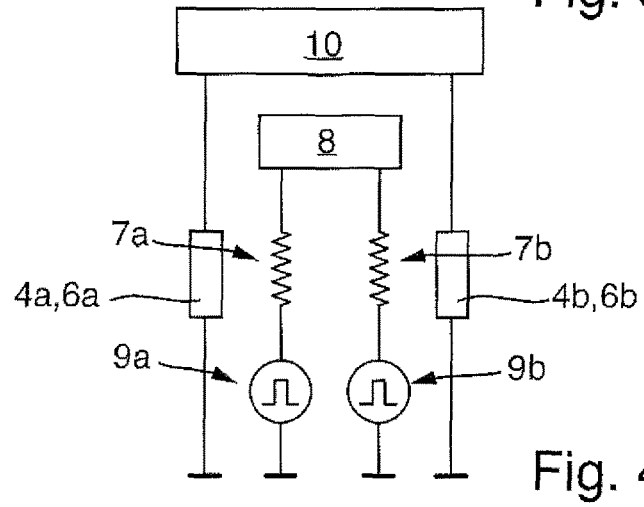
FIG. 4 is a block diagram of a second embodiment of the sensor.

FIG. 4 shows a block diagram of the second embodiment of the sensor 1. The first and second heating elements 7a and 7b are supplied in measurement operation with first and second heating powers via the first signal 9a and the second signal 9b ascertained in the adjustment operation. For this, the power supply unit 8 supplies the first and second heating elements 7a and 7b, in each case, individually, with the first, respectively the second, signals 9a, 9b. In this way, the temperature field across the two heating elements 7 is shifted in such a manner that the resistance values of the two temperature sensors 6 assume values such that the resistance bridge, which serves for determining the temperature difference ΔT, is adjusted. The evaluation unit can be, for example, a microprocessor or even an analog amplifier.

In the case of the manufacture, such as above described and independently of the embodiment of the flow sensor, due to layout- and manufacturing tolerances as well as inhomogeneities in the substrate 3, asymmetries between the two temperature sensors 4 occur, which leads to the fact that in determining the flow of the medium 2 based on the first signal 9a and the second signal 9b undesired deviations (zero point offset) occur. This is attributable to the different resistance values of the two heatable temperature sensors and has the result that even in the case of no flow of the medium 2, a measured value unequal to zero is measured. In order to overcome this disadvantage, the sensor 1 is subjected to an adjustment procedure.

For this adjustment, the sensor 1 is brought into an adjustment operation, in which the medium 2 does not flow. In the adjustment operation, the first heatable temperature sensor is fed a first heating power and the second heatable temperature sensor a second heating power. These heating powers are varied until an essentially symmetric temperature distribution, respectively temperature field, arises over the two heating elements and, thus, the measured value of the sensor equals essentially zero. In other words, a thermal adjustment of the two heating elements is performed, so that the first and second heating powers, which are fed to the first and second heating elements, are different, in order so to achieve an offset adjustment of the two heating elements. The heating powers ascertained in this way in the adjustment operation are then furnished in the sensor and used for measurement operation of the flow sensor.

A power supply unit, not shown in FIG. 1, then supplies in the actual measurement operation of the flow sensor, the first heating element with the first signal and the second heating element with the second signal, such that the first heating element is fed the earlier determined first heating power, i.e. that earlier determined in the adjustment operation, and the second heating element is fed the earlier determined second heating power.

The heat adjustment can occur, for example, with a continuous and/or discretely tunable electrical current, an electrical voltage or a mixture of electrical current and voltage. Furthermore, pulse methods provide options for the electrical currents and/or voltages. Proven especially practical has been pulse width modulated signals, since these can be very finely adjusted via the duty cycle, respectively duty factor. Additionally, the power loss of the two heating elements can be kept very small. A further opportunity provides that a pulse modulated signal is superimposed with a continuous signal, so that a large part of the needed offset adjustment is performed via the continuous signal and the rest via the very finely, respectively exactly, adjustable, pulse width modulated signal.

The invention claimed is:

1. A thermal flow sensor for determining flow of a medium, comprising:
    a substrate;
    first and second temperature sensors arranged on said substrate, said first and second temperature sensors are embodied as heatable temperature sensors or as a first non-heatable temperature sensor, which is associated with a first heating element, and as a second non-heatable temperature sensor, which is associated with a second heating element;
    a power supply unit, which is embodied to supply said first heatable temperature sensor or said first heating element by means of a first signal with a first heating power determined earlier during an adjustment operation, in which the flow is brought to essentially zero and in which the flow of the medium is held at essentially zero, and to supply said second heatable temperature sensor or said second heating element by means of a second signal with a second heating power, which is different to the first heating power, determined earlier in the adjustment operation; and
    an evaluation unit, which is embodied to ascertain a temperature difference (ΔT) between said first temperature sensor and said second temperature sensor in a measurement operation for determining flow of the medium and to determine, based on the temperature difference (ΔT), a measured value, which represents the flow of the medium, wherein:
    said evaluation unit is embodied to ascertain said first heating power to be supplied to said first heatable temperature sensor or said first heating element in the adjustment operation and to ascertain said second heating power to be supplied to said second heatable temperature sensor or said second heating element in the adjustment operation; and said evaluation unit is embodied to ascertain said first and second heating powers in such a manner that in case of supplying said first heatable temperature sensor or said first heating element with said first heating power and in case of supplying said second heatable temperature sensor or said second heating element with said second heating power the measured value is essentially zero.

2. The flow sensor as claimed in claim 1, wherein:
said first and second temperature sensors or said first and second heating elements are embodied on said substrate in such a manner that said first and second heatable temperature sensors adjoin one another or at least partially overlap.

3. The flow sensor as claimed in claim 1, wherein:
said heatable temperature sensors are composed of a temperature dependent resistance material, and
said evaluation unit ascertains the temperature difference ($\Delta T$) based on a temperature coefficient of the temperature dependent resistance material.

4. The flow sensor as claimed in claim 1, wherein:
said first and second heating elements are composed of an essentially temperature independent and/or temperature dependent resistance material; and
said evaluation unit ascertains the temperature difference ($\Delta T$) between said first and second temperature sensors.

5. The flow sensor as claimed in claim 1, wherein:
said power supply unit individually activates said first and second heatable temperature sensors or said first and second heating elements.

6. The flow sensor as claimed in claim 1, wherein:
said first and second signals are continuous signals or discrete signals or a mixture of continuous and discrete signals.

7. The flow sensor as claimed in claim 1, wherein:
said power supply unit during measurement operation provides said first heating power and said second heating power independently of the temperature difference ($\Delta T$).

8. The flow sensor as claimed in claim 1, wherein:
said first and second signals are pulse width modulated signals; and
said power supply unit sets said first heating power and said second heating power via on off ratios of the pulse width modulated signals.

9. The flow sensor as claimed in claim 1, wherein:
said first and second non-heatable temperature sensors are embodied as thermocouples, resistance temperature sensors, NTC resistances, radiation sensors or semiconductor elements.

10. A method for determining flow of a medium with a thermal flow sensor which comprises: a substrate; first and second temperature sensors arranged on said substrate, said first and second temperature sensors are embodied as heatable temperature sensors or as a first non-heatable temperature sensor, which is associated with a first heating element, and as a second non-heatable element temperature sensor, which is associated with a second heating element; a power supply unit, the method comprising the steps as follows:

adjusting the flow sensor, by placing the flow sensor in an adjustment operation, the adjustment operation comprising:

bringing the flow of the medium to essentially zero and holding the flow of the medium ascertaining a first heating power to be supplied to the first heatable temperature sensor or the first heating element; and ascertaining a second heating power to be supplied to the second heatable temperature sensor or the second heating element, wherein said first and second heating powers are different and wherein said first and second heating powers are ascertained in such a manner that in case of supplying the first heatable temperature sensor or the first heating element with the first heating power and in case of supplying the second heatable temperature sensor or the second heating element with the second heating power a measurement signal of the flow sensor is essentially zero; and measuring the flow of the flowing medium, wherein;

for measuring the flow, the flow sensor is placed in a measurement operation and in the measurement operation the first heatable temperature sensor or the first heating element is supplied with the first heating power ascertained in the adjustment operation and the second heatable temperature sensor or the second heating element is supplied with the second heating power ascertained in the adjustment operation so that a temperature difference ($\Delta T$) is ascertained between the first temperature sensor and the second temperature sensor and based on the temperature difference ($\Delta T$) the flow of the medium is determined.

11. The method as claimed in claim 10, wherein:
continuous signals or discrete signals or a mixture of continuous and discrete signals are used as first and second signals for supplying the first and second heating powers.

12. The method as claimed in claim 11, wherein:
pulse width modulated signals are used as first and second signals.

* * * * *